United States Patent [19]

Huddle

[11] Patent Number: 5,345,241
[45] Date of Patent: Sep. 6, 1994

[54] SELF-CONTAINED METHOD FOR CORRECTION OF AN INERTIAL SYSTEM OVER A BODY OF WATER

[75] Inventor: James R. Huddle, Chatsworth, Calif.

[73] Assignee: Litton Systems, Inc., Beverly Hills, Calif.

[21] Appl. No.: 986,333

[22] Filed: Dec. 7, 1992

[51] Int. Cl.⁵ .................... G01C 21/08; G06G 7/78
[52] U.S. Cl. ........................... 342/63; 342/120; 364/454; 364/457
[58] Field of Search ............ 342/63, 64, 120, 121; 364/453, 454, 456, 457

[56] References Cited

U.S. PATENT DOCUMENTS 4,175,285 11/1979 Dansac et al. .................. 342/64 X
5,272,639 12/1993 McGuffin ........................ 342/63 X Primary Examiner—Gilberto Barron, Jr.
Attorney, Agent, or Firm—Elliott N. Kramsky

[57] ABSTRACT

A method and apparatus for performing on-board corrections to the computed navigation variables of an inertial system on an aircraft while flying over a body of water. Onboard instruments, including a barometric altimeter and a radar altimeter, measure the vertical distance of the aircraft above an ellipsoidal model of the earth and above the body of water respectively. An on-board computer calculates the differences between such heights over a plurality of points along the path the aircraft travels over the water as indicated by its inertial navigation system. The differences are compared with a map of the undulation of the geoid encompassing the region to determine the deviation of the navigated course from the true course. Appropriate corrections to the aircraft's inertial system may then be made to reduce error.

8 Claims, 2 Drawing Sheets

SELF-CONTAINED METHOD FOR CORRECTION OF AN INERTIAL SYSTEM OVER A BODY OF WATER

BACKGROUND

1. Field of the Invention

The present invention relates to apparatus and methods for in-flight correction of an inertial navigation system employed on an aircraft. More particularly, this invention pertains to the performance of such calibration over a body of water without resort to devices and signals generated by external sources.

2. Description of the Prior Art

The in-flight correction of an aircraft's inertial navigation system is complicated when the aircraft proceeds over a body of water. When flying over land, the navigation system can rely upon known monument locations to provide the necessary feedback for updating the navigation variables of the inertial system and thereby overcome the effects of inertial instrument (accelerometer, gyro) errors.

When the aircraft proceeds over water, it no longer can rely upon the monuments that prove so useful over land as benchmarks. Rather, externally-based radio navigation systems must be utilized. LORAN, for example, can provide the over-water pilot with signals indicative of the aircraft's position. By taking radio fixes from such a system the pilot may then periodically correct the on-board inertial navigation system and its instruments.

Unfortunately, the use of externally-generated radio signals is not always possible. Military applications, for example, must be take into account the risk of destruction of an external signal source, the need for radio silence and other potential disruptions to the use of externally-generated navigation signals.

SUMMARY OF THE INVENTION

The present invention addresses and overcomes the above-identified shortcomings of the prior art by providing, in the first aspect, an on-board method for the correction of the inertial system of an aircraft as it proceeds on a course over a region of a body of water. The location of a point horizontally along the course is continuously determined by means of the aircraft's inertial navigation system. The vertical distance of the aircraft above an ellipsoidal model of the geoid (the geoid is an equipotential surface of the earth's gravity field to which the surface of a free body of water such as the ocean will conform on average-except for modelable effects due to major ocean currents such as the Gulf Stream) that includes such a region and the vertical distance of the aircraft above the surface of the body of water (geoid) are both then measured at such a point.

The difference between these two measured vertical distances is computed to determine the measured undulation of the geoid at such point. The measured undulation of the geoid is then compared with the undulation of the geoid at the point as has been predetermined by various types of gravitational surveys (gravity intensity measurements, satellite altimetry measurements, etc.) The plurality of such undulation measurements is compared to undulation values along the course as predetermined from gravitational surveys. A position correction is then determined by correlating the measured undulation values with the values indicated by surveys. Thereafter, at least one of the aircraft's inertial navigation system variable computation is adjusted by means of such position correction.

In another aspect, the invention provides apparatus for correcting at least one of the inertial system computed navigation variables of an aircraft while proceeding over a region of a body of water. Such apparatus includes means for measuring the vertical distance of the aircraft above an ellipsoidal model of the geoid and means for measuring the vertical distance of the aircraft above the body of water (geoid). Means are provided for computing the difference between said vertical distances as is means for storing a map of the undulation of the geoid of the region and for comparing a plurality of such differences with the map of the undulation of the geoid for the region. Means for additionally provided for correlating the differences with the map and adjusting at lest one of the aircraft's navigation variable computations.

The preceding and other features and advantages of this invention will become further apparent from the detailed description that follows. This detailed description is accompanied by a set of drawing figures. Numerals of the drawing figures corresponding to those of the written description, point to the various features of the invention. Like numerals refer to like features throughout both the written description and the drawing figures.

DETAILED DESCRIPTION

Figure 1:
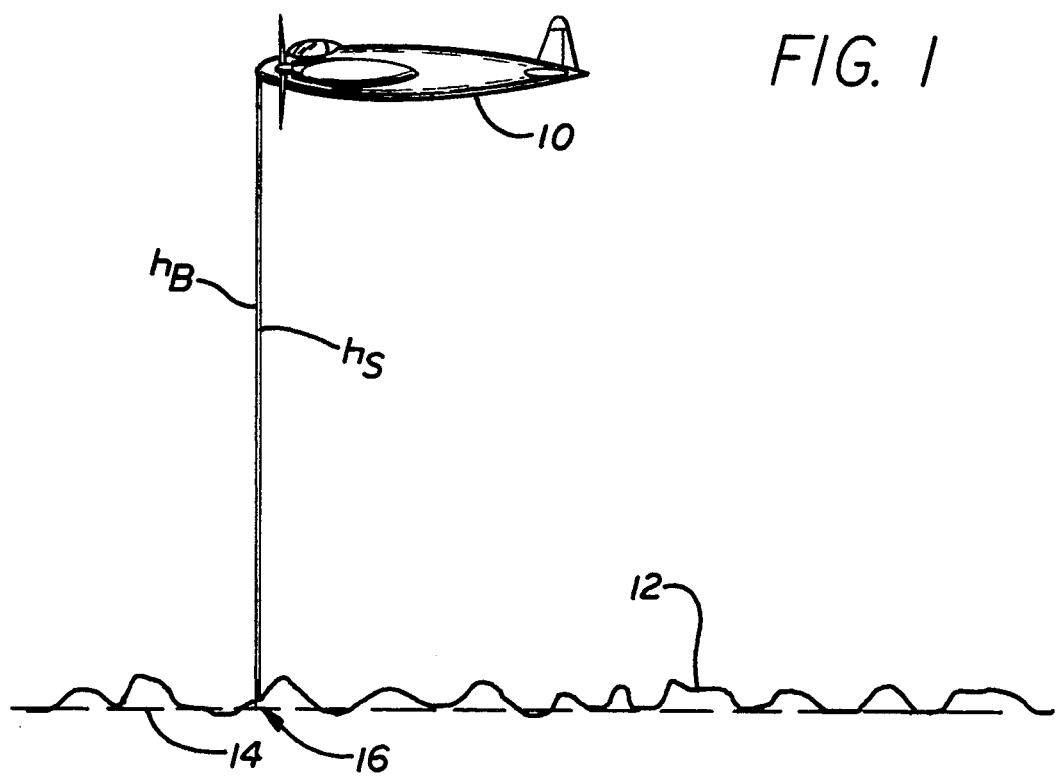
FIG. 1 illustrates the measurements, generated by on-board instruments, that are required for the correction of an aircraft's inertial navigation system over a body of water in accordance with the present invention.

FIG. 1 illustrates an airplane 10 passing above a point 16 within a region of a body of water 12. The craft is adapted to employ a method and apparatus in accordance with the present invention that utilizes, in large measure, apparatus that is commonly utilized aboard the airplane 10. The invention permits one to navigate over a body of water while untethered to externally-generated navigation aids such as LORAN. As discussed earlier, since bodies of water lack visible, fixed structures that serve as landmarks for aboveground navigation techniques, navigation above a body of water has required reliance upon techniques such as LORAN that employ an external signal source.

A dashed line 14 indicates the outline of an ellipsoid that comprises a least squares fit to the geoid of the region of the earth that includes the point 16. As will be discussed later, the point 16 represents one of a plurality of points along the airplane's flight path for making measurements of the undulation of the geoid approximated by the ellipsoid 14. Measurements related to the field of the earth's gravity at such points serve as inputs for correcting the navigation variables of the airplane 10 as determined by its standard inertial navigation system that includes gyros and accelerometers.

Figure 2:
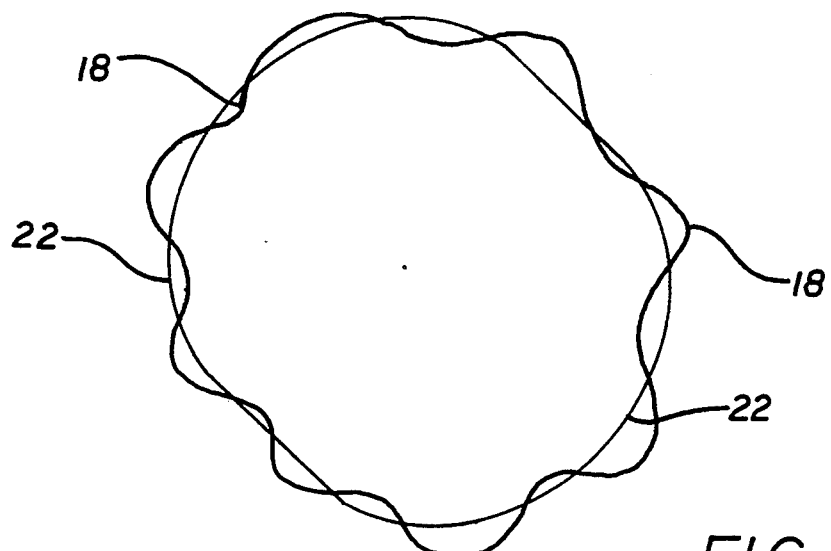
FIG. 2 is a detailed view of the difference between an ellipsoidal model of the earth, and the surface of a body of water which on average conforms to the geoid.

As is well known in the gravitational sciences, the geoid describes an equipotential surface of the gravitational field of the earth 18. FIG. 2 is an outline or section of a full-earth geoid (as opposed to one based upon regional data). The geoid 18 has a warped shape that reflects local disturbances or discontinuities in the field of gravity due, for example, to abrupt changes in terrain, mineral and oil deposits and the like. An ellipsoid 22, defined by its semi-major axis and flatness parameters, represents a least-squares fit to the geoid 18. By employing a Laplace differential equation and associating the actual with the normal gravity field, an expression for the geoid is obtained from the spherical harmonic expansion of the disturbing potential:

$$T(r) = \frac{GM}{r}\left(\sum_{\iota=2}^{\infty}(a/r)^{\iota}\sum_{m=0}^{\iota}(\Delta C_{\iota,m}\cos m\lambda + \Delta S_{\iota,m}\sin m\lambda)P_{\iota,m}\cos\theta\right)$$

Where $\Delta C_{6,m}$ and $\Delta S_{6,m}$ are differences between the fully normalized spherical harmonic coefficients of the actual and normal gravity field. Spherical harmonic expansions for the height anomaly and the geoid height follow by dividing $T(r)$ by the normal gravity $\gamma_O$ respectively. A full discussion of the analysis of geoids and their relationship to the earth's gravity field is found in Wolfgang Torge, Gravimetry, Walter de Gruyter (Berlin and New York 1989).

The plotting of the earth's gravitational field is regularly performed by numerous national and international agencies and a number of models are generated and updated on a continuing basis. Such data is readily and publicly available. Published ellipsoid parameters describe geoid-reference ellipsoids of both local and worldwide scope. That is, geoids and associated ellipsoids may be based upon gravity data that is limited to a particular area but usually include data based upon the available measurements of gravity for the entire earth to obtain highest accuracy. At the present time, the ellipsoid of reference for the region of the United States is the so-called Clarke 1866. Data describing the various geodetic systems, reference ellipsoids, the geoid and the earth gravitational model is described in the publication of The Defense Mapping Agency entitled "Department of Defense World Geodedic System 1984: Its Definition and Relationships with Local Geodedic Systems" *Defense Mapping Agency Technical Report* 8350.2 (Sep. 30, 1987).

The wrinkled surface of the geoid 18 reflects the many factors that affect the earth's field of gravity.

Figure 3:
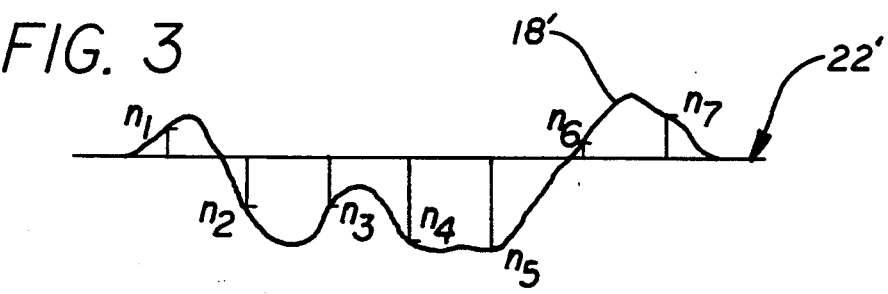
FIG. 3 is a detailed illustration of the difference between the geoid and the least-squares fit ellipsoid to the geoid which is the undulation of the geoid in a region.

FIG. 3 is a greatly enlarged portion of a region 18' of the full earth geoid 18 and the corresponding section 22' of the least-squares-fit ellipsoid 22 of that geoid. As can be seen, vertical distances $n_i$ define the undulations of the geoid 18' from the ellipsoid 22' within the region. Various organizations compute and publish contour maps of such undulations which present the outlines of surfaces of a given deviation $n_i$ of the geoid from the corresponding least-squares-fit ellipsoid.

Figure 4:
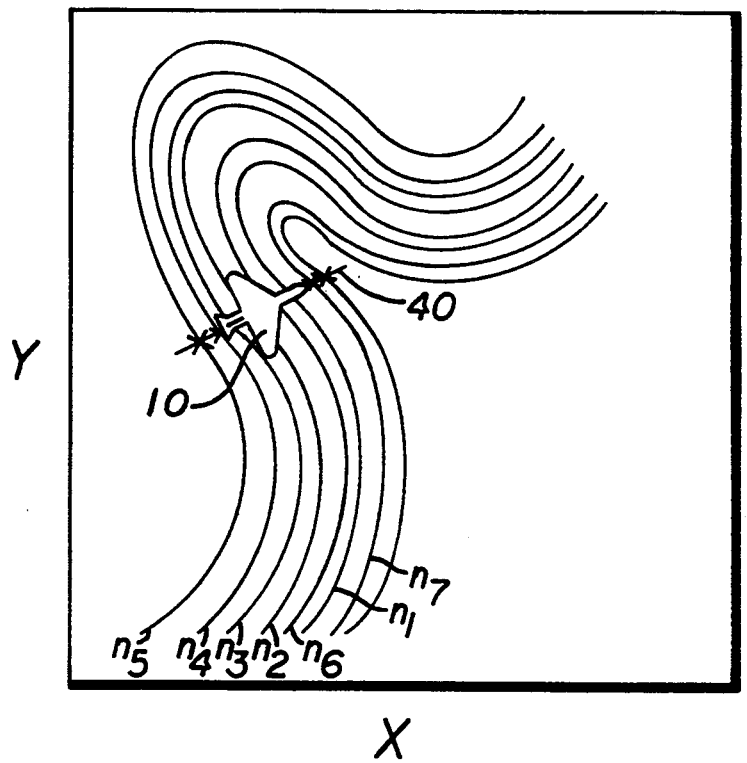
FIG. 4 is a plan view of an aircraft superimposed upon the contour map of the undulations of the geoid in the region of a body of water over which the craft is traveling for the purpose of illustrating the method of the invention for correcting the drift of the aircraft's inertial navigation system on board while flying over the body of water.

FIG. 4 is a view of a portion of a contour map of the undulations of the geoid shown in FIG. 3. As can be seen, adjacent contour lines correspond to areas characterized by undulations $n_i$ having "adjacent" values; that is, as one proceeds along the x and y coordinates defining the region of interest, the $n_i$ values can either increase or decrease.

It is well known in the field of gravimetry that the free surface of a body of water, on average, will conform to the geoid. Areas of major ocean current disturbances do not satisfy the above; however, such known effects can be incorporated into the undulation map so that the position information is not degraded.

Figure 5:
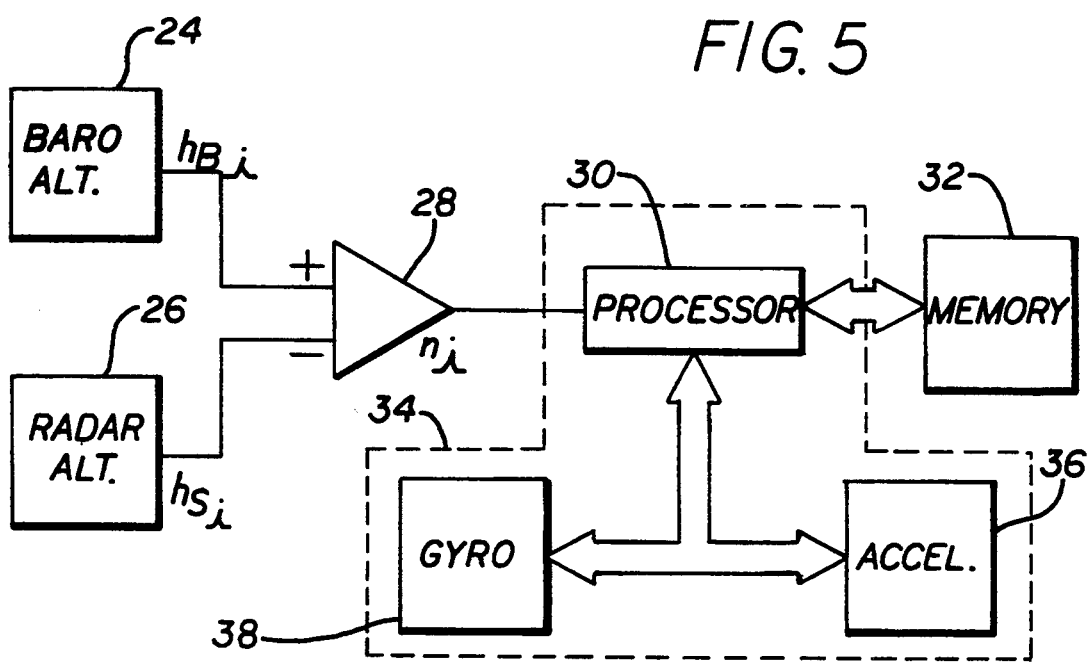
FIG. 5 is a schematic block diagram of on-board apparatus for correcting the inertial navigation system of an aircraft and calibrating its inertial instruments in accordance with the invention.

FIG. 5 is a block diagram of an on-board apparatus for eliminating the effects of inertial navigation system drift by employing the gravitationbased method of the present invention. Such apparatus includes a barometric altimeter 24 and a radar altimeter 26. As seen in FIG. 1, such devices are employed for measuring $h_B$, the altitude of the airplane 10 above the best-fit ellipsoidal model of the geoid, and $h_S$, the altitude above the surface of the body of water conforming to the geoid (each at the representative data point 16) respectively.

Returning to FIG. 5, the outputs of the barometric altimeter 24 and the radar altimeter 26 are applied to a differencing device 28 whose output represents the difference $n_i$ between the two values, taken simultaneously, as the airplane flies over the representative data point 16.

The inertial navigation system 34 of the aircraft, comprising an arrangement of gyros 38 and accelerometers 36, and a processor 30, provides the pilot with an indication of the latitude and longitude of the point 16. The measurements of $h_B$ and $h_S$ are taken, in pairs, at a number of navigated points of coordinates $(x_i, y_i)$ comprising, in combination, the nominal course 40 as indicated on FIG. 4. It can be noted from FIG. 4 that 20 the indicated course intersects and thereby generates a plurality of undulation values $n_i$, each corresponding to a location $(x_i, y_i)$ as indicated by the aircraft's inertial navigation system.

The values $n_i$ that are generated by the data measured by the barometric and radar altimeters are output from the differential amplifier 28 to an on-board microprocessor 30. The processor 30 receives both a stream of measured undulation values $n_i$ from the difference 28 and a corresponding stream of coordinates $(x_i, y_i)$ from the inertial navigation system 34. The undulation and coordinate values are associated by means of the processor 30.

A mapping of the undulation of the geoid of the region of interest (i.e. that over which the airplane 10 is flying) is stored in a memory device 32. As the airplane 10 travels along the course 40, thereby successively passing over different adjacent portions of the region of interest, a succession of maps of the undulation of the reference geoid are successively recalled from the memory 32 by the processor 30 to update the inertial system computed navigation variables and calibrate the inertial instruments data (discussed below). Successive comparisons are made in the processor 30 between the undulation values output from the difference 28 (based upon the measurements of $h_S$ and $h_B$ taken at position points, such as the representative data point 16, computed by the inertial navigation system along the indicated course 40) and the undulation values for the course preestablished by the gravitational survey data which yields the reference undulation contour map. By employing standard correlation techniques that are well known in the art, the difference between measured undulation and undulation values obtained from the contour maps stored in memory 32 (position correction) is used to establish the actual course of the airplane 10 and to determine the error in the computed navigation variables of the craft's inertial navigation system 34. It is well understood in the navigation art (through standard Kalman filtering theory) that numerous navigation variables are readily and straightforwardly amenable to adjustment and correction in response to the identification of a position error or correction. Such navigation variables include, but are not limited to, position, velocity, and orientation of the navigation system along with bias and scale factor instrument errors.

Thus it is seen that the present invention provides a method and apparatus for correcting the navigation variables computed by an inertial system and further for calibrating the inertial instruments on an aircraft while traveling over a body of water. By utilizing the teachings of this invention, the pilot may correct the drift of the inertial instruments without relying upon external sources such as those required, for example, by LORAN. The future availability of more and improved accuracy gravitational survey data permits continual improvement of the undulation contour maps stored in the memory 32 so that the accuracy of the calibration method increases as gravitational survey techniques improve and new reference undulation maps are published.

By providing a method for correcting the drift of the aircraft's inertial navigation system without reliance upon external signal sources, the method and apparatus of the invention provide for totally self-contained accurate navigation that is especially useful for military applications.

While this invention has been described with reference to its presently preferred embodiment, it is not limited thereto. Rather, this invention is limited only insofar as it is defined by the following set of patent claims and includes all equivalents thereof.

What is claimed is:

1. An on-board method for the correction of the inertial system of an aircraft as it proceeds on a course over a region of a body of water comprising the steps of:
    a) continuously determining the location of a point horizontally along said course by means of said aircraft's inertial navigation system; and
    b) measuring the vertical distance of said aircraft, at said point, above an ellipsoidal model of a geoid that includes said region; and
    c) measuring the vertical distance of said aircraft, at said point, above the surface of said body of water; then
    d) computing the difference between the values measured in steps b and c to determine the measured undulation of said geoid at said point; then
    e) comparing said measured undulation of said geoid with the undulation of said geoid at said point as determined by gravitational surveys; then
    f) repeating steps a through e; then
    g) determining a position correction by correlating said measured undulation values with values predetermined by said survey; and then
    h) adjusting at least one of the aircraft's inertial navigation system variable computations by means of said position correction.

2. A method as defined in claim 1 further including the step of measuring the vertical distance of said aircraft above said ellipsoidal model of the earth by means of a barometric altimeter.

3. A method as defined in claim 1 further including the step of measuring the vertical distance of said aircraft above said body of water by means of a radar altimeter.

4. A method as defined in claim 1 further including the step of correlating said measured and survey values of undulations by means of an on-board computer.

5. Apparatus for correcting at least one of the inertial system computed navigation variables of an aircraft while proceeding over a region of a body of water comprising, in combination:
    a) means for measuring the vertical distance of said aircraft above an ellipsoidal model of the earth;
    b) means for measuring the vertical distance of said aircraft above said body of water;
    c) means for computing the difference between said vertical distances;
    d) means for storing a map of the undulation of the geoid of said region; and
    e) means for comparing a plurality of said differences with said map of the undulation of the geoid of said region, correlating said differences with said map and adjusting at least one of said aircraft's navigation variable computations.

6. Apparatus as defined in claim 5 wherein said means for measuring the vertical distance of said aircraft above an ellipsoidal model of the earth is a barometric altimeter.

7. Apparatus as defined in claim 5 wherein said means for measuring the vertical distance of said aircraft above said body of water is a radar altimeter.

8. Apparatus as defined in claim 5 wherein said means for comparing, correlating and adjusting is an on-board computer.

* * * * *